Dec. 4, 1951  B. M. HYMAN  2,577,328
SPRING BALANCED RECEIVING CONVEYER
FOR PORTABLE ELEVATORS
Filed July 14, 1948  2 SHEETS—SHEET 1
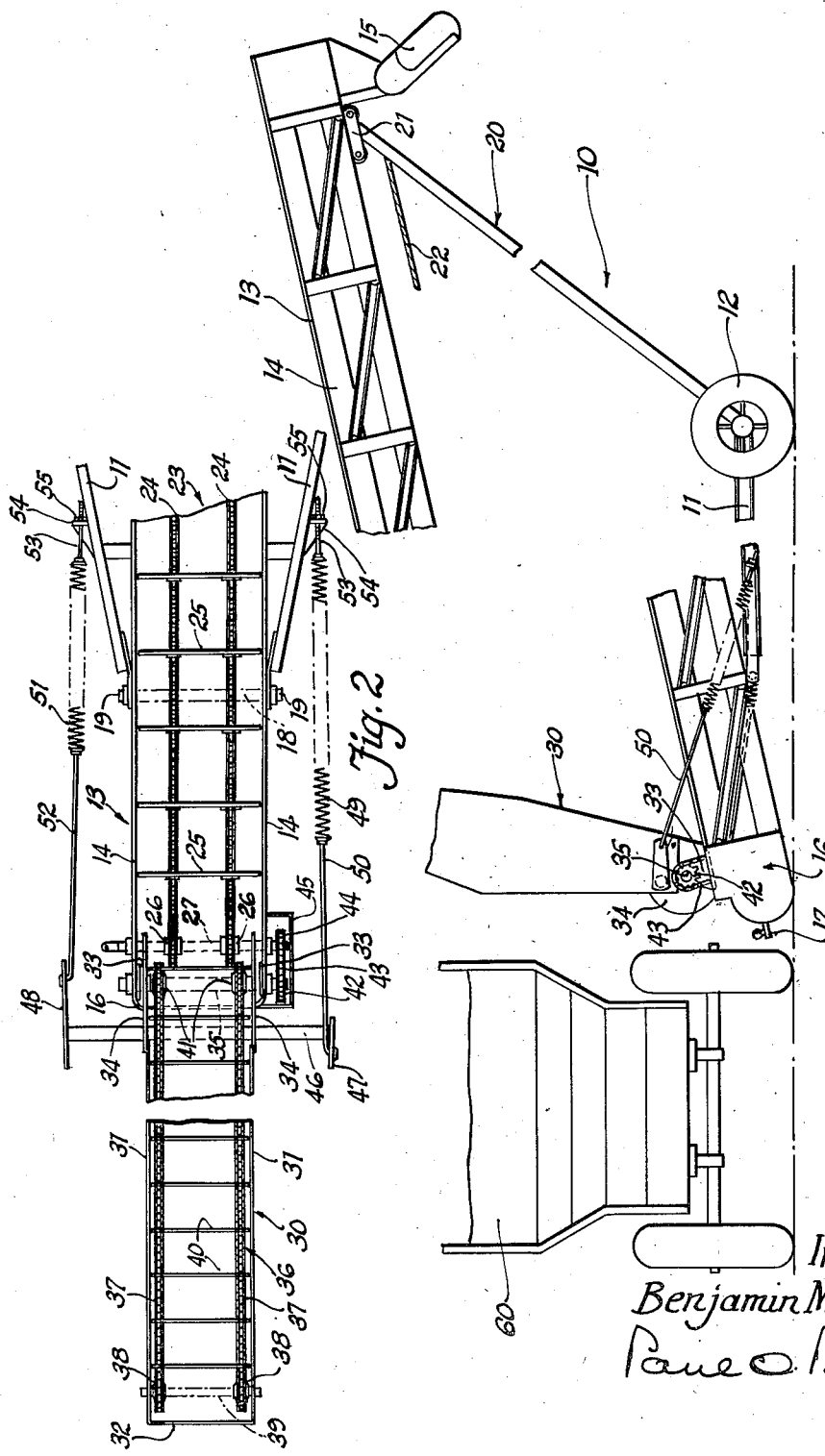
Inventor.
Benjamin M. Hyman
Paul O. Pippel
Atty Inventor.
Benjamin M. Hyman
Paul O. Pippel
Atty Patented Dec. 4, 1951

2,577,328

UNITED STATES PATENT OFFICE 2,577,328

SPRING BALANCED RECEIVING CONVEYER FOR PORTABLE ELEVATORS

Benjamin M. Hyman, Moline, Ill., assignor to International Harvester Company, a corporation of New Jersey Application July 14, 1948, Serial No. 38,663

5 Claims. (Cl. 198—87)

1

This invention relates to a portable elevator of a type that is utilized for elevating grain into silos, barns or other receiving structures.

A portable elevator usually consists of a vehicle frame which is mounted on ground wheels. A long elevator tube or conveyor trough is pivotally connected to the frame and extends angularly upwardly with respect thereto. The conveyor trough includes, generally, a discharge device at one end and a boot section at the other end. A derrick is provided for raising and lowering the trough to the desired height. The conveyor trough is also usually provided with a receiving hopper which is positioned adjacent one end of the conveyor trough and is utilized for the purpose of conveying materials to the trough. The operating position of the receiving hopper is substantially horizontal and the hopper is arranged to receive materials as they are being discharged from the farm wagon or other transporting vehicle. The receiving hopper is generally arranged to be pivoted so that it may be raised upwardly and lowered over on top of the conveyor trough during the transport position. For transporting this type of elevator the boot section usually includes a tractor hitch which may be connected to the drawbar of the tractor.

The receiving hopper may also be swung upwardly to a vertical position so that a truck, tractor or other vehicle may be driven forwardly adjacent to the conveyor trough without the necessity of driving the tractor or truck rearwardly in order to position same with respect to the receiving hopper. The receiving hopper also includes a movable conveyor which adds to its weight thus creating difficulties in swinging the hopper from a horizontal position. Since the operator may lift and lower the receiving hopper a number of times during the operation, it can readily be seen that the manipulating of the hopper can become a wearisome and tiring task. It is a prime object, therefore, of this invention to provide an improved receiving hopper for a portable elevator, said hopper being adapted to be easily and quickly raised from an operating to a transport position.

Another object is to provide an improved receiving hopper for a portable elevator, said receiving hopper including resilient springs arranged to assist in the raising and swinging of the receiving hopper from a horizontal operating position to a vertical position and also from a transport position back to a substantially vertical position.

These and other objects will become more

2 readily apparent upon a reading of the specification when examined in connection with the annexed drawings.

In the drawings:

Fig. 1 is a side-elevational view showing a portable elevator and a farm truck containing material to be transported by the elevator.

Fig. 2 is a plan view of portions of the elevator and receiving hopper shown in Fig. 1.

Figure 3:
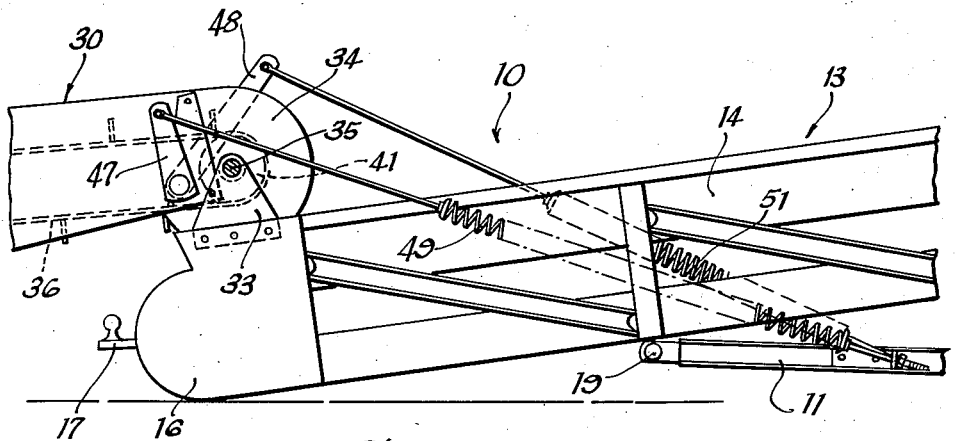
Fig. 3 is a side-elevational view of portions of a portable elevator and receiving hopper, said view showing the receiving hopper in an operating position for conveying material to the endless conveyor of the elevator.

Referring particularly to Figs. 1 and 2, a portable elevator is generally designated by the reference character 10. The elevator 10 consists of a longitudinally extending wheeled frame 11 which is suitably supported at one end by a pair of ground wheels 12, only one of which is shown. The wheeled frame 11 supports an angularly extending conveyor trough 13. The trough 13 includes a pair of longitudinally, laterally-spaced side members 14. A discharge end 15 is provided at one end of the trough 13. The other end of the trough 13 is provided with a boot section 16. A hitch element 17 may be of conventional design and is connected to the boot section 16 whereby the elevator may be connected to the drawbar of a tractor or other vehicle.

The conveyor trough 13 is connected to the wheeled frame 11 by means of a transversely extending member 18 as indicated by the reference character 19. A derrick or lifting frame 20 is supported on the main frame 11, may be pivoted with respect thereto, and extends upwardly underneath the conveyor trough 13. The upper end of the derrick 20 is provided with a roller structure 21 which may engage and slide along the underneath surface of the trough 13. A cable or rope 22 is fastened to the derrick 20 and, in turn, is connected to a winch mechanism not shown. The conveyor trough 13 may thus be angularly raised and lowered to the desired position for discharging the material which is conveyed. An endless conveyor 23 is positioned for movement within the conveyor trough 13. The conveyor includes a pair of laterally spaced chains 24 having a plurality of slats 25 connected thereto. The chains 24 extend over sprockets 26 which are rigidly secured to a shaft 27. The shaft 27 may be rotated by means of a power take-off (not shown) in operative connection with the power unit of a tractor.

A receiving hopper is generally designated by the reference character 30 and this hopper is positioned adjacent the boot section 16 of the conveyor trough 13. The receiving hopper 30 includes a pair of laterally spaced side members 31 which extend longitudinally and are connected at their rear ends by means of an end member 32. A pair of laterally upwardly extending brackets 33 are connected to trough 13 adjacent the boot section 16. The receiving hopper 30 is also provided with a pair of transversely spaced end plates 34 which are connected to side members 31. A transverse shaft 35 extends through the upwardly extending brackets 33 and through the end plates 34. By virtue of the pivotal connection between the shaft 35 and the receiving hopper 30, the receiving hopper 30 may be swung or pivoted upwardly with respect to the conveyor trough 13.

An endless conveyor 36 is positioned for movement within the receiving hopper 30. The endless conveyor 36 includes laterally spaced chains 37 which are drawn about a pair of sprockets 38. The sprockets 38 are secured to a shaft 39 which is positioned at the rearmost end of the receiving hopper 30. The conveyor 30 also includes the transversely extending slats 40. The chains 37 are drawn, at the forward portion of the receiving hopper, about sprockets 41 which, in turn, are rigidly secured to the transverse shaft 35. A sprocket 42 is secured to one end of the transverse shaft 35 and this sprocket, in turn, is driven by means of a chain 43 which, in turn, is trained about a sprocket 44. The sprocket 44 is secured to be driven by the driving shaft 27. A cover 45 encloses these chain and sprocket drives.

Figure 4:
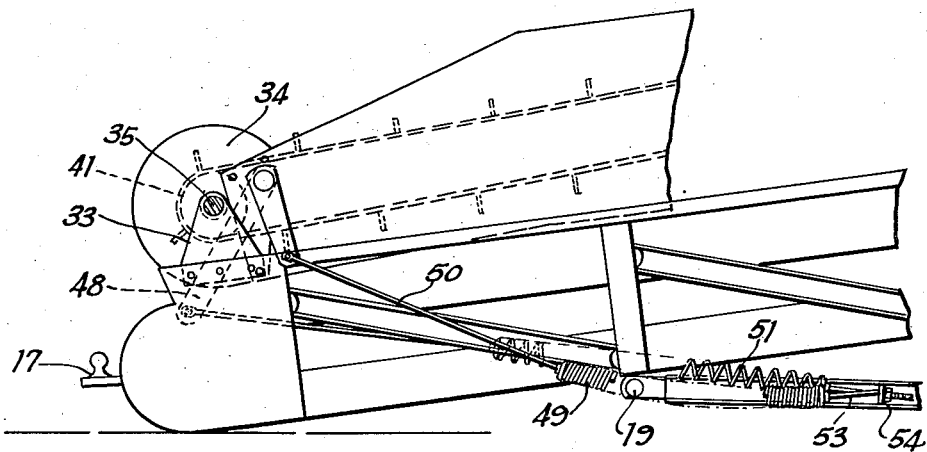
Fig. 4 is a side-elevational view similar to Fig. 3 showing the receiving hopper swung or folded into a transport position.

As best shown in Figs. 2, 3 and 4, a torsion tube 46 extends through the end plates 34 of the receiving hopper 30. The torsion tube 46 has connected at each end, respectively, an arm 47 and an arm 48. A spring or resilient member 49 is connected by means of a tension rod 50 to the arm 47. The arm 48, which is positioned at the opposite side of the receiving hopper, has connected thereto a spring or resilient member 51 by means of a tension rod 52. Both springs 49 and 51 include links 53 which extend through brackets 54 connecting the springs to the wheel frame 11. The links 53 are threaded at their ends. Bolts 55 are suitably threaded onto the links 53 for adjusting the tension of the springs 49 and 51.

In the position shown in Figs. 2 and 3, the receiving hopper 30 is disposed in an operating position whereby material may be delivered to the conveyor trough 13. In the position shown in Fig. 1 the receiving hopper 30 has been swung vertically from the operating position so that a truck or other vehicle can drive past and adjacent to the conveyor trough. After the truck has taken the position shown in Fig. 1, the receiving hopper 30 will again be lowered and material from the truck will be delivered thereto.

After the operator is finished using the portable elevator, he will want to transport the same to another location. In order to accomplish this the receiving hopper is swung upwardly from the operating position to a vertical position. From the vertical position shown in Fig. 1, the receiving hopper 30 is then rotated into the position shown in Fig. 4 where it lies substantially parallel to and on top of the conveyor trough 13. In this position the elevator may be transported. As best shown in Fig. 3, where the receiving hopper 30 is shown in the operating position, the arm 47 is so positioned that the spring 49 is stretched to an expanded condition. The weight of the receiving hopper keeps the spring thus tensioned. The arm 48, however in this position of the hopper, is positioned in angular relation with respect to the arm 47 and the spring 51 is in a slackened position. As the operator lifts the end of the hopper 30 the spring 49 serves to exert a force urging the hopper 30 upwardly thereby assisting the operator in the manual lifting of the hopper to the vertical position shown in Fig. 1. The spring 51 is in a slackened position until the hopper 30 reaches the vertical position. As the hopper 30 reaches the vertical position and is rotated further beyond this position, the spring 49 is placed in a slackened position. The arm 48 now moves into the position shown in Fig. 4 whereupon the spring 51 is in turn placed under tension. In view of the weight of the hopper 30, the hopper overcomes the tensioning force of the spring and remains in the transport position as shown. When it is desired to again swing the hopper back into the operating position, the operator raises the hopper and the spring 51 exerts a force on the arm 48, tending to pivot the hopper and thereby urging the hopper to swing upwardly, thus assisting the operator in his manual effort to swing the hopper back to the vertical and operating positions. It can be readily seen that the action of the springs can be controlled by the adjusting nut 55. By merely adjusting the nuts 55 the proper balance of the hopper may be obtained.

It can now be seen that hopper 30 may be readily swung about its pivotal connection with respect to conveyor trough 13 and the springs 49 and 51 function to exert a lifting force with respect to the hopper 30, thus aiding and assisting the operator during lifting and moving of the hopper into and from its operating and transport positions.

It must be understood that changes and modifications may be made in this construction which do not depart from the spirit of the invention as disclosed, nor the scope thereof as defined in the appended claims.

What is claimed is:

1. A portable elevator having a conveyor trough; means for delivering material to said trough comprising a receiving hopper, means pivotally connecting said hopper to said conveyor trough whereby said hopper is swingable from a substantially horizontal operating position, to a vertical position, and substantially beyond said vertical position to a folded transport position, resilient means connected to said hopper, said means including a first expansible member arranged to urge said hopper from the operating position to a vertical position, and a second expansible member arranged to urge said hopper from the folded transport position to a vertical position.

2. A portable elevator comprising in combination; a conveyor trough having a discharge end and a boot section, an endless conveyor movable within the trough; means for raising and lowering said trough angularly with respect to the ground; a receiving hopper positioned adjacent the boot section, said receiving hopper including a movable conveyor, means connecting one end of said hopper to said boot section for pivotal movement about a transverse axis, said hopper being swingable from a substantially horizontal operating position, to a vertical position, and to a folded transport position above and substantially parallel to the conveyor trough, a first arm connected to said hopper, a first spring connected to said first arm and to said conveyor trough, a second arm connected to the hopper, a second spring connected to the second arm and the trough, said springs being constructed and arranged whereby the first spring exerts a force urging said hopper upwardly from the operating to the vertical position, and whereby the second spring exerts a force urging said hopper upwardly to a vertical position from the folded transport position, said springs thereby assisting the manual raising and lowering of said hopper to and from the vertical position.

3. A portable elevator comprising in combination; a conveyor trough having a discharge end and a boot section, an endless conveyor movable within the trough; a receiving hopper positioned adjacent the boot section, said receiving hopper including a movable conveyor, means connecting one end of said hopper to said boot section for pivotal movement with respect thereto, said hopper being swingable from a substantially horizontal operating position, to a vertical position, and to a folded transport position above and substantially parallel to the conveyor trough, first and second springs connected to the hopper to the trough, said springs being constructed and arranged whereby the first spring exerts a force uring said hopper upwardly from the operating to the vertical position, and whereby the second spring exerts a force uring said hopper upwardly to a vertical position from the folded transport position, said springs thereby assisting the manual raising and lowering of said hopper to and from the vertical position.

4. A portable elevator comprising in combination; a conveyor trough positioned for angular movement with respect to the ground, an endless conveyor movable within the trough; a receiving hopper, said receiving hopper including a movable conveyor, means connecting one end of said hopper to said boot section for pivotal movement about a transverse axis, said hopper being swingable from a substantially horizontal operating position, to a vertical position, and to a folded transport position substantially parallel to the conveyor trough, a first arm connected to said hopper, a first spring connected to said first arm and to said conveyor trough, a second arm connected to the hopper, a second spring connected to the second arm and the trough, said springs being constructed and arranged whereby the first spring exerts a force urging said hopper upwardly from the operating to the vertical position, and whereby the second spring exerts a force urging said hopper upwardly to a vertical position from the folded transport position, said springs thereby assisting the manual raising and lowering of said hopper.

5. A portable elevator comprising in combination; a conveyor trough; means for raising and lowering said trough angularly with respect to the ground, a receiving hopper, means connecting one end of said hopper for pivotal movement about a transverse axis, said hopper being swingable from a substantially horizontal operating position, to a vertical position, and to a folded transport position with respect to the conveyor trough, a first and second resilient means connected to the trough, said means being constructed and arranged whereby the first means exerts a force urging said hopper upwardly from the operating to the vertical position, and whereby the second means exerts a force urging said hopper upwardly to a vertical position from the folded transport position.

BENJAMIN M. HYMAN.

REFERENCES CITED

The following references are of record in the file of this patent:

UNITED STATES PATENTS

| Number | Name | Date |
| --- | --- | --- |
| 817,896 | Bartholomew | Apr. 17, 1906 |
| 946,008 | Byers | Jan. 11, 1910 |
| 977,518 | Feldt | Dec. 6, 1910 |
| 1,165,460 | Steele | Dec. 28, 1915 |